(12) United States Patent
Cao et al.

(10) Patent No.: US 10,198,689 B2
(45) Date of Patent: Feb. 5, 2019

(54) METHOD FOR OBJECT DETECTION IN DIGITAL IMAGE AND VIDEO USING SPIKING NEURAL NETWORKS

(71) Applicant: HRL Laboratories, LLC, Malibu, CA (US)

(72) Inventors: Yongqiang Cao, Newton, MA (US); Qin Jiang, Oak Park, CA (US); Yang Chen, Westlake Village, CA (US); Deepak Khosla, Camarillo, CA (US)

(73) Assignee: HRL Laboratories, LLC, Malibu, CA (US)

( * ) Notice: Subject to any disclaimer, the term of this patent is extended or adjusted under 35 U.S.C. 154(b) by 176 days.

(21) Appl. No.: 15/269,777

(22) Filed: Sep. 19, 2016

(65) Prior Publication Data
US 2017/0300788 A1 Oct. 19, 2017

Related U.S. Application Data

(63) Continuation-in-part of application No. 14/609,775, filed on Jan. 30, 2015, and a continuation-in-part of application No. 14/680,057, filed on Apr. 6, 2015.

(60) Provisional application No. 61/933,913, filed on Jan. 30, 2014, provisional application No. 62/220,850, filed on Sep. 18, 2015.

(51) Int. Cl.
| G06K 9/62 | (2006.01) |
|---|---|
| G06N 3/04 | (2006.01) |
| G06K 9/46 | (2006.01) |
| G06K 9/42 | (2006.01) |
| G06K 9/44 | (2006.01) |

(52) U.S. Cl.
CPC ............. *G06N 3/04* (2013.01); *G06K 9/42* (2013.01); *G06K 9/44* (2013.01); *G06K 9/4652* (2013.01); *G06K 9/4671* (2013.01); *G06K 9/6267* (2013.01)

(58) Field of Classification Search
None
See application file for complete search history.

(56) References Cited

U.S. PATENT DOCUMENTS

| 7,260,261 B2 * | 8/2007 | Xie .................... G06K 9/3233 382/173 |
| 8,160,354 B2 | 4/2012 | Paquier |
| 8,369,652 B1 | 2/2013 | Khosla et al. |

(Continued)

OTHER PUBLICATIONS

Cruz-Albrecht, J.M., Yung, M.W., & Srinivasa, N. (2012). Energy-efficient neuron, synapse and STDP integrated circuits. IEEE Trans. on Biomedical Circuits and Systems, 6(3), 246-256.

(Continued)

*Primary Examiner* — Jayesh A Patel
(74) *Attorney, Agent, or Firm* — Tope-McKay & Associates

(57) ABSTRACT

Described is a system for object detection in images or videos using spiking neural networks. An intensity saliency map is generated from an intensity of an input image having color components using a spiking neural network. Additionally, a color saliency map is generated from a plurality of colors in the input image using a spiking neural network. An object detection model is generated by combining the intensity saliency map and multiple color saliency maps. The object detection model is used to detect multiple objects of interest in the input image.

24 Claims, 11 Drawing Sheets
(6 of 11 Drawing Sheet(s) Filed in Color)

(56) References Cited

U.S. PATENT DOCUMENTS

| | | | | |
|---|---|---|---|---|
| 8,942,466 | B2* | 1/2015 | Petre | G06K 9/6232 |
| | | | | 375/E7.001 |
| 8,943,008 | B2* | 1/2015 | Ponulak | G06N 3/08 |
| | | | | 706/25 |
| 8,977,582 | B2* | 3/2015 | Richert | G06K 9/62 |
| | | | | 382/156 |
| 9,218,563 | B2* | 12/2015 | Szatmary | G06N 3/049 |
| 9,346,167 | B2 | 5/2016 | O'Connor | |
| 9,552,546 | B1* | 1/2017 | Piekniewski | G06N 3/08 |
| 9,613,310 | B2* | 4/2017 | Buibas | G06N 3/049 |
| 9,870,617 | B2* | 1/2018 | Piekniewski | G06T 7/90 |
| 9,881,349 | B1* | 1/2018 | Meier | G06K 9/4671 |
| 2003/0002731 | A1 | 1/2003 | Wersing | |
| 2006/0070026 | A1* | 3/2006 | Balinsky | G06F 17/211 |
| | | | | 717/106 |
| 2007/0022068 | A1* | 1/2007 | Linsker | G05B 13/026 |
| | | | | 706/23 |
| 2008/0201282 | A1 | 8/2008 | Garcia | |
| 2011/0267499 | A1* | 11/2011 | Wan | H04N 5/232 |
| | | | | 348/231.99 |
| 2013/0073498 | A1* | 3/2013 | Izhikevich | G06N 3/105 |
| | | | | 706/27 |
| 2013/0151450 | A1* | 6/2013 | Ponulak | G06N 3/049 |
| | | | | 706/25 |
| 2013/0204814 | A1* | 8/2013 | Hunzinger | G06N 3/02 |
| | | | | 706/16 |
| 2013/0297539 | A1* | 11/2013 | Piekniewski | G06N 3/049 |
| | | | | 706/20 |
| 2013/0297542 | A1 | 11/2013 | Piekniewski et al. | |
| 2013/0325776 | A1* | 12/2013 | Ponulak | G06N 3/08 |
| | | | | 706/25 |
| 2013/0325777 | A1* | 12/2013 | Petre | G06N 3/049 |
| | | | | 706/26 |
| 2014/0016858 | A1* | 1/2014 | Richert | G06K 9/62 |
| | | | | 382/156 |
| 2015/0269485 | A1 | 9/2015 | Julian | |
| 2015/0309589 | A1* | 10/2015 | Chang | G06F 3/0213 |
| | | | | 345/168 |
| 2015/0310303 | A1* | 10/2015 | Andreopoulos | G06K 9/4676 |
| | | | | 382/158 |
| 2016/0034812 | A1 | 2/2016 | Gibson | |
| 2016/0086052 | A1 | 3/2016 | Piekniewski et al. | |
| 2017/0277979 | A1* | 9/2017 | Allen | G06K 9/6269 |
| 2017/0300788 | A1* | 10/2017 | Cao | G06K 9/4671 |

OTHER PUBLICATIONS

Merolla, P., Arthur, J., Akopyan, F., Imam, N., Manohar, R., & Modha, D. S. (2011). A digital neurosynaptic core using embedded crossbar memory with 45pj per spike in 45nm. In Custom Integrated Circuits Conference (CICC), 2011 IEEE (pp. 1-4).
Rumelhart, D. E., Hinton, G. E., & Williams, R. J. (1986). Learning representations by back-propagating errors. Nature, 323, 533-536.
Itti, L., (2013) "Neovision2 annotated video datasets," http://ilab.usc.edu/neo2/dataset/tower/training/ taken on Jan. 14, 2015.
Ciresan, D, Meier, U, and Schmidhuber, J (2012). Multi-column deep neural networks for image classification. In 2012 IEEE Conference on Computer Vision and Pattern Recognition (CVPR) (pp. 3642-3649).
Folowosele F, Vogelstein, RJ, and Etienne-Cummings, R (2011). Towards a cortical prosthesis: implementing a spike-based HMAX model of visual object recognition in silico. IEEE Journal on Emerging and Selected Topics in Circuits and Systems 1, 516-525.
Krizhevsky, A, Sutskever, I, and Hinton, G (2012). ImageNet classification with deep convolutional neural networks. In Advances in Neural Information Processing Systems 25 (pp. 1106-1114).
LeCun, Y, Bottou, L, Bengio, Y, and Haffner, P (1998). Gradient-based learning applied to document recognition. Proceedings of the IEEE, 86(11), 2278-2324.
Masquelier, T and Thorpe, SJ (2007). Unsupervised learning of visual features through spike timing dependent plasticity. PLoS computational biology 3, 0247-0257.
Perez-Carrasco, JA, Serrano, C, Acha, B, Serrano-Gotarredona, T, and Linares-Barranco, B (2010). Spike-based convolutional network for real-time processing. In 2010 International Conference on Pattern Recognition (pp. 3085-3088).
Riesenhuber, M and Poggio, T (1999). Hierarchical models of object recognition in cortex. Nature Neurosci., 2(11), 1019-1025.
Serre T, Wolf, L, Bileschi, S, Riesenhuber, M, and Poggio, T (2007). Robust object recognition with cortex-like mechanisms. IEEE Trans. Pattern Anal. Mach. Intell., 29(3), 411-426.
Balduzzi, David, and Giulio Tononi. "What can neurons do for their brain? Communicate selectivity with bursts." Theory in Biosciences 132.1 (2013), pp. 27-39.
Nere, Andrew, et al. "A neuromorphic architecture for object recognition and motion anticipation using burst-STDP." PloS one 7.5 (2012), pp. e36958.
Dan Y, Poo MM (2004) Spike timing-dependent plasticity of neural circuits. Neuron 44, pp. 23-30.
Brette, et. Al, "Simulation of networks of spiking neurons: A review of tools and strategies," J Comput Neurosci, (2007), pp. 1-50, DOI 10.1007/s10827-007-0038-6.
Laurent Itti, Christof Koch, "A saliency-based search mechanism for overt and covert shifts of visual attention," Vision Research, 40 (10), pp. 1489-1506, (2000).
Office Action 1 for U.S. Appl. No. 14/680,057, dated Mar. 1, 2017.
Evolving spiking neural networks: A survey, Stefan Schliebs et al., Evolving systems, DOI: 10.1 007/s12530-013-9074-9, Jun. 2013, pp. 1-12.
Image processing with spiking Neuron Networks, Meftah et al., Springer, SCI427, 2012, pp. 525-544.
Artificial Neural image processing applications: A survey, Quintana et al., Advance online publication, 2012, pp. 1-13.
Itti, L., Koch, K., and Niebur, E. (1998). A model of saliency-based visual attention for rapid scene analysis. IEEE Trans. on Pattern Analysis and Machine Intelligence, 20(11), pp. 1254-1259.
Itti, L. and Koch, K. (2000). A saliency-based search mechanism for overt and covert shifts of visual attention, , in Vision Research, 40, pp. 1489-1506.
Cruz-Albrecht, et al. (2012) "Energy efficient neuron, synapse and STDP integrated circuits" in IEEE Transactions on Biomedical Circuits and Systems, 6(3), pp. 246-256.
Merolla et. al (2014) "A million spiking-neuron integrated circuit with a scalable communication network and interface" in Science, vol. 345, Issue 6197, pp. 668-673.
Notification of Transmittal of International Search Report and the Written Opinion of the International Searching Authority for PCT/US2017/034093; dated Aug. 22, 2017.
International Search Report of the International Searching Authority for PCT/US2017/034093; dated Aug. 22, 2017.
The Written Opinion of the International Searching Authority for PCT/US2017/034093; dated Aug. 22, 2017.
Laurent Itti, et al. "A saliency-based search mechanism for overt and covert shifts of visual attention," Vision Research 40, (2000), pp. 1489-1506.
Response to Office Action 1 for U.S. Appl. No. 14/680,057, dated Jun. 30, 2017.
Office Action 2 for U.S. Appl. No. 14/680,057, dated Oct. 19, 2017.
Response to Office Action 2 for U.S. Appl. No. 14/680,057, dated Jan. 3, 2018.
Notice of Allowance for U.S. Appl. No. 14/680,057, dated Feb. 1, 2018.
Office Action 1 for U.S. Appl. No. 14/609,175, dated Oct. 6, 2017.
Farabet, Clement, et al. "Hardware accelerated convolutional neural networks for synthetic vision systems." Circuits and Systems (ISCAS), Proceedings of 2010 IEEE International Symposium on. IEEE, 2010.
Camufias-Mesa, L., et al. "On scalable spiking ConvNet hardware for cortex-like visual sensory processing systems." Circuits and Systems (ISCAS), Proceedings of 2010 IEEE International Symposium on. IEEE, 2010.
Maass, Wolfgang, and Henry Markram. "On the computational power of circuits of spiking neurons." Journal of computer and system sciences 69.4 (2004): 593-616.

(56) References Cited

OTHER PUBLICATIONS

O'Connor, Peter, et al. "Real-time classification and sensor fusion with a spiking deep belief network." Frontiers in neuroscience 7 (2013).
Perez-Carrasco, Jose-Antonio, et al. "Spike-based convolutional network for real-time processing." Pattern Recognition (ICPR), 2010 20th International Conference on. IEEE, 2010.
Farabet, Clement. Towards real-time image understanding with convolutional networks. Diss. Universite Paris-Est, 2013.
Response to Office Action 1 for U.S. Appl. No. 14/609,775, dated Jan. 8, 2018.
Office Action 2 for U.S. Appl. No. 14/609,775, dated May 8, 2018.
Cao, Yongqiang, Yang Chen, and Deepak Khosla. "Spiking deep convolutional neural networks for energy-efficient object recognition." International Journal of Computer Vision 113.1 (2015): 54-66.
Matsugu, Masakazu, et al. "Convolutional spiking neural network model for robust face detection." Neural Information Processing, 2002. ICONIP'02. Proceedings of the 9th International Conference on. vol. 2. IEEE, 2002.
Krizhevsky, Alex, Ilya Sutskever, and Geoffrey E. Hinton. "Imagenet classification with deep convolutional neural networks." Advances in neural information processing systems. 2012.
Response to Office Action 2 for U.S. Appl. No. 14/609,775, dated Jul. 30, 2018.

\* cited by examiner

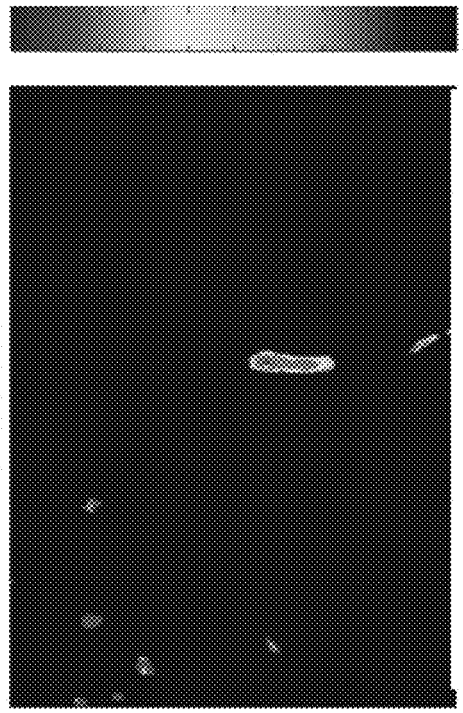
FIG. 7A
FIG. 7B

METHOD FOR OBJECT DETECTION IN DIGITAL IMAGE AND VIDEO USING SPIKING NEURAL NETWORKS

CROSS-REFERENCE TO RELATED APPLICATIONS

This is a Continuation-in-Part application of U.S. application Ser. No. 14/609,775, filed in the United States on Jan. 30, 2015, entitled, "Method for Neuromorphic Implementation of Convolution. Neural Networks," which is a Non-Provisional application of U.S. Provisional Application No. 61/933,713, filed in the United States on Jan. 30, 2014, entitled, "Method for Neuromorphic Implementation of Convolutional Neural Networks," the entirety of which are incorporated herein by reference.

This is ALSO a Continuation-in-Part application of U.S. application Ser. No. 14/680,057, filed in the United States on Apr. 6, 2015, entitled, "Spiking Neural Network Simulator for Image and Video Processing," the entirety of which is incorporated herein by reference.

This is ALSO a Non-Provisional Patent application of U.S. Provisional Patent Application No. 62/220,850 filed Sep. 18, 2015, entitled, "Method for Object Detection in Digital image and Video Using Spiking Neural Networks," the entirety of which is incorporated herein by reference.

GOVERNMENT LICENSE RIGHTS

This invention was made with government support under U.S. Government Contract Number HR0011-09-C-000. The government has certain rights in the invention.

BACKGROUND OF INVENTION

(1) Field of Invention

The present invention relates to a system for object detection and, more particularly, to a system for object detection using spiking neural networks.

(2) Description of Related Art

Moving object detection models, or motion models, are good at detecting moving objects in videos taken from a stationary camera (i.e., the background is not moving). However, motion models are not good at detecting still objects or moving objects in videos taken from a moving camera, because the background is moving too.

On the other hand, saliency models can detect salient objects, whether the objects are moving or not, in both fixed and moving camera videos. However, traditional saliency models can still miss non-salient, but interesting, objects. Inspired by the early primate visual system, Itti et al. suggested a saliency model to detect salient spots in an image in "A model of saliency-based visual attention for rapid scene analysis," in IEEE Trans. on Pattern. Analysis and Machine Intelligence, 20(11), 1254-1259 (hereinafter referred to as Itti 1998) and "A saliency-based search mechanism for overt and covert shifts of visual attention," in Vision Research, 40, 1489-1506 (hereinafter referred to as Itti 2000), both of which are hereby incorporated by reference as though fully set forth herein. Their saliency model finds salient spots by building up a saliency map from multiple channels, such as image intensity and colors. However, like other saliency models it can miss less salient, yet interesting, objects.

Thus, a continuing need exists for a method of object detection that can detect both salient and less salient objects of interest in videos, including moving camera videos.

SUMMARY OF THE INVENTION

The present invention relates to a system for object detection and, more particularly, to a system for object detection using spiking neural networks. The system comprises one or more processors and a memory having instructions such that when the instructions are executed, the one or more or more processors perform multiple operations. The system generates an intensity saliency map from an intensity of an input image having color components using a spiking neural network. A color saliency map is generated from each color component in the input image using a spiking neural network. An object detection model is generated by combining the intensity saliency map and at least one color saliency map. The object detection model is used to detect multiple objects of interest in the input image.

In another aspect, a plurality of spikes are generated from the intensity of the input image. The plurality of spikes are convolved with Gaussian kernels to generate a plurality of Gaussian maps, each Gaussian map having a different scale. A set of feature maps are generated from the plurality of Gaussian maps. A set of final feature maps are generated by adding the set of feature maps, and the intensity saliency map is generated by adding the set of final feature maps.

In another aspect, a plurality of spikes are generated for each color component in the input image. For each color component, the plurality of spikes are convolved with Gaussian kernels to generate a plurality of Gaussian maps, each Gaussian map having a different scale. For each color component, a set of feature maps s generated from the plurality of Gaussian maps. For each color component, a set of final feature maps are generated by adding the set of feature maps, and for each color component, a color saliency map is generated by adding the set of final feature maps.

In another aspect, spikes from each intensity saliency map and color saliency map are accumulated, and a threshold is applied to the accumulated spikes. A final saliency spike activity is obtained, and object detection boxes are obtained from the final saliency spike activity.

In another aspect, the color components are normalized according to an overall intensity of the input image.

In another aspect, normalizing includes increasing spike activity for a bright image.

In another aspect, normalizing includes reducing spike activity for a dark image.

In another aspect, both salient and less salient objects of interest are detected in the input image.

In another aspect, the object detection model is implemented in low power spiking neuromorphic hardware.

In another aspect, the present invention also comprises a method for causing a processor to perform the operations described herein.

Finally, in yet another aspect, the present invention also comprises a computer program product comprising computer-readable instructions stored on a non-transitory computer-readable medium that are executable by a computer having a processor for causing the processor to perform the operations described herein.

BRIEF DESCRIPTION OF THE DRAWINGS

The file of this patent or patent application publication contains at least one drawing executed in color. Copies of this patent or patent application publication with color drawing(s) will be provided by the Office upon request and payment of the necessary fee.

The objects, features and advantages of the present invention will be apparent from the following detailed descriptions of the various aspects of the invention in conjunction with reference to the following drawings, where:

FIG. 7A is an input image according to various embodiments of the present disclosure;

FIG. 7B is an illustration of a medium-scale blue color channel detecting a blue car in FIG. 7A according to various embodiments of the present disclosure;

DETAILED DESCRIPTION

Figure 1:
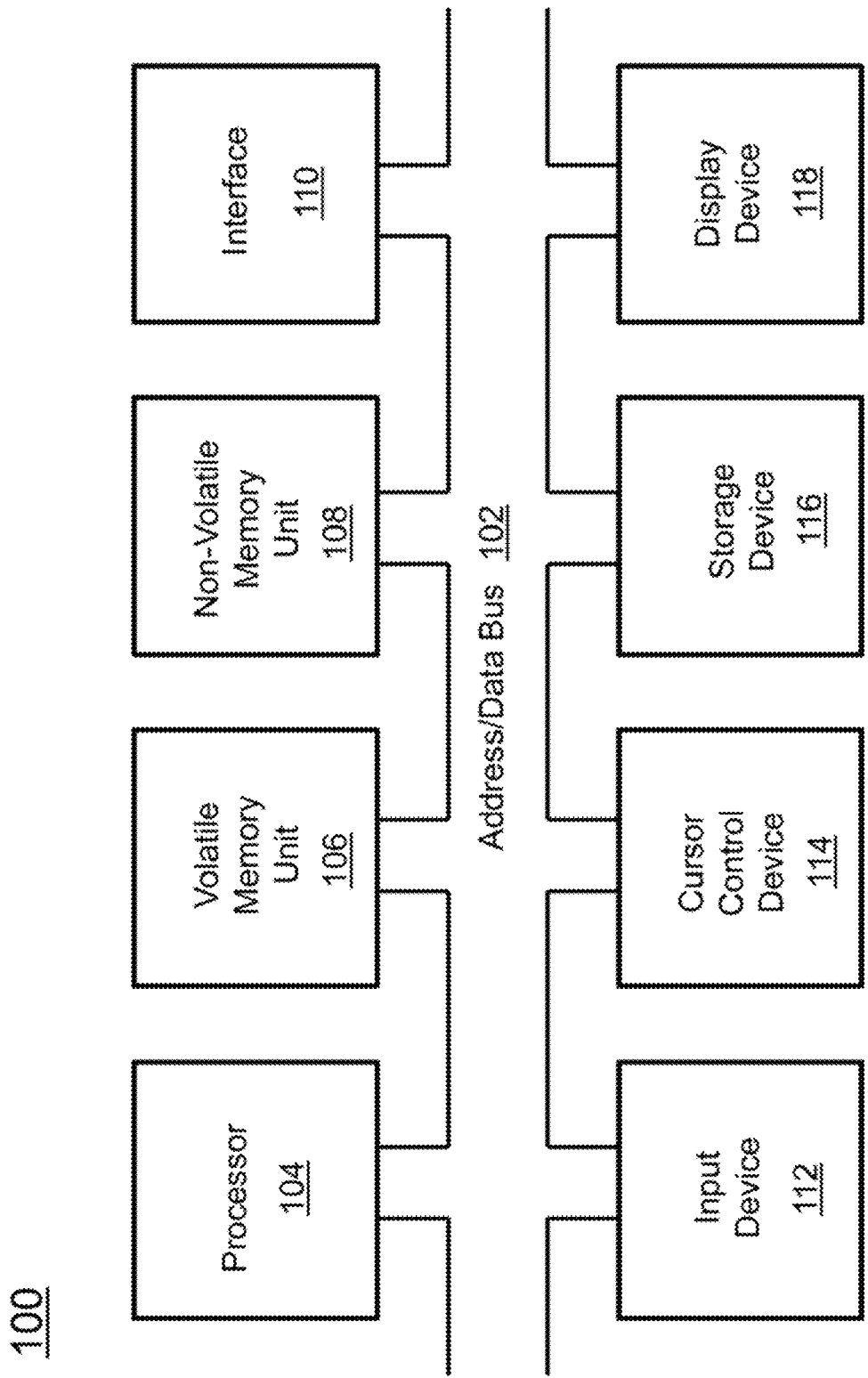
FIG. 1 is a block diagram depicting the components of a system for object detection using spiking neural networks according to various embodiments of the present disclosure.

The present invention relates to a system for object detection and, more particularly, to a system for object detection using spiking neural networks. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention However, it will be apparent to one skilled in the art that the present invention may be practiced without necessarily being limited to these specific details. In other instances, well-known structures and devices are shown in block diagram form, rather than in detail, in order to avoid, obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 11.2, Paragraph 6.

Please note, if used, the labels left, right, front, back, top, bottom, forward, reverse, clockwise and counter-clockwise have been used for convenience purposes only and are not intended to imply any particular fixed direction. Instead, they are used to reflect relative locations and/or directions between various portions of an object. As such, as the present invention is changed, the above labels may change their orientation.

Before describing the invention in detail, first a description of various principal aspects of the present invention is provided. Following that is an introduction that provides an overview of the present invention. Finally, specific details of the present invention are provided to give an understanding of the specific aspects.

(1) Principal Aspects

The present invention has three "principal" aspects. The first is a system for object detection using spiking neural networks. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, or a field programmable gate array.

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device. For example, the input device 112 may include one or more sensors, such as a camera for video or still images, a microphone, or a neural sensor. Other example input devices 112 may include an accelerometer, a GPS sensor, or a gyroscope.

In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
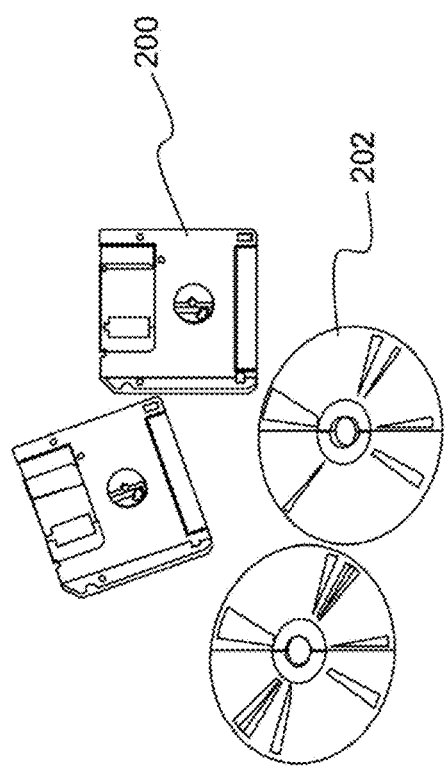
FIG. 2 is an illustration of a computer program product according to various embodiments of the present disclosure.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(2) Introduction

For recognizing objects in an image or video, the first step is to determine the possible locations in the image that objects are found. For moving objects in a fixed camera video, most motion models can do a reasonable job. However, motion models do not work for still objects. Motion models also cannot be easily extended to work for moving camera videos, because everything, including background, is moving here. The prevailing method to locate objects in an image is based on exhaustive search with a trained classifier for objects of interest. As the total number of windows to evaluate in an exhaustive search is huge, the computational cost is impractical for most applications. On the other hand, when a human looks at a scene, attention plays a key role in locating objects. Inspired by primate early visual attention systems, saliency models (as described in Itti 1998 and Itti 2000) attempt to detect salient spots (regions) in an image by building up a saliency map. However, when focusing on detecting salient objects, saliency models can miss non-salient objects. The system according to embodiments described herein detects still objects in a fixed camera video or objects in a moving camera video (e.g., on a moving platform, such as an unmanned aerial vehicle (UAV)) even when the objects are not salient in other models.

(3) Specific Details of the Invention

Described is a spiking neural network (SNN) model for object detection in images or videos. The SNN implementation maps directly to emerging ultra-low power spiking neuromorphic hardware applications, such as those described by Cruz-Albrecht, et al. in "Energy efficient neuron, synapse and STDP integrated circuits" in IEEE Transactions on Biomedical Circuits and Systems, 6(3), 246-256, 2012 and Merolla et, al in "A million spiking-neuron integrated circuit with a scalable communication network and interface" in Science, Vol. 345, Issue 6197, 668-673, 2014, both of which are incorporated by reference as though fully set forth herein. Additionally, the system according to some embodiments of the present disclosure can detect still objects in a fixed camera video or objects in a moving camera video (e.g., unmanned aerial vehicle (UAV)), no matter whether the objects are salient or not in a typical condition. Further, described is a method for color channel normalization according to overall image brightness. This makes the model according to embodiments of the present disclosure work well in various lighting conditions.

Compared to existing motion models, the system described herein can detect still objects in a fixed camera video or all interesting objects in a moving camera video. Compared to existing saliency models, it can detect objects of interest that cannot be detected by these models. Compared to traditional methods of object detection using exhaustive search, the present invention provides a very efficient computation model for object detection.

(3.1) Spiking Neuron Model

The spiking neurons for the neuromorphic implementation according to some embodiments of the present disclosure are all leaky integrate-and-fire type neurons whose membrane potentials (V) are defined by:

$$V(t)=L+V(t-1)+I(t), \quad (1)$$

If $V(t) \geq \theta$, spike and reset $V(t)=0$, (2)

If $V(t)<0$, reset $V(t)=0$. (3)

Here, L is a leakage parameter, and I(t) is the weighted, sum of all inputs. Whenever its membrane potential V exceeds a threshold θ, the neuron fires and V is reset to zero (equation (2)). The membrane potential V is not allowed to go below its resting state zero (equation (3)).

(3.2) Intensity Saliency

Figure 3:
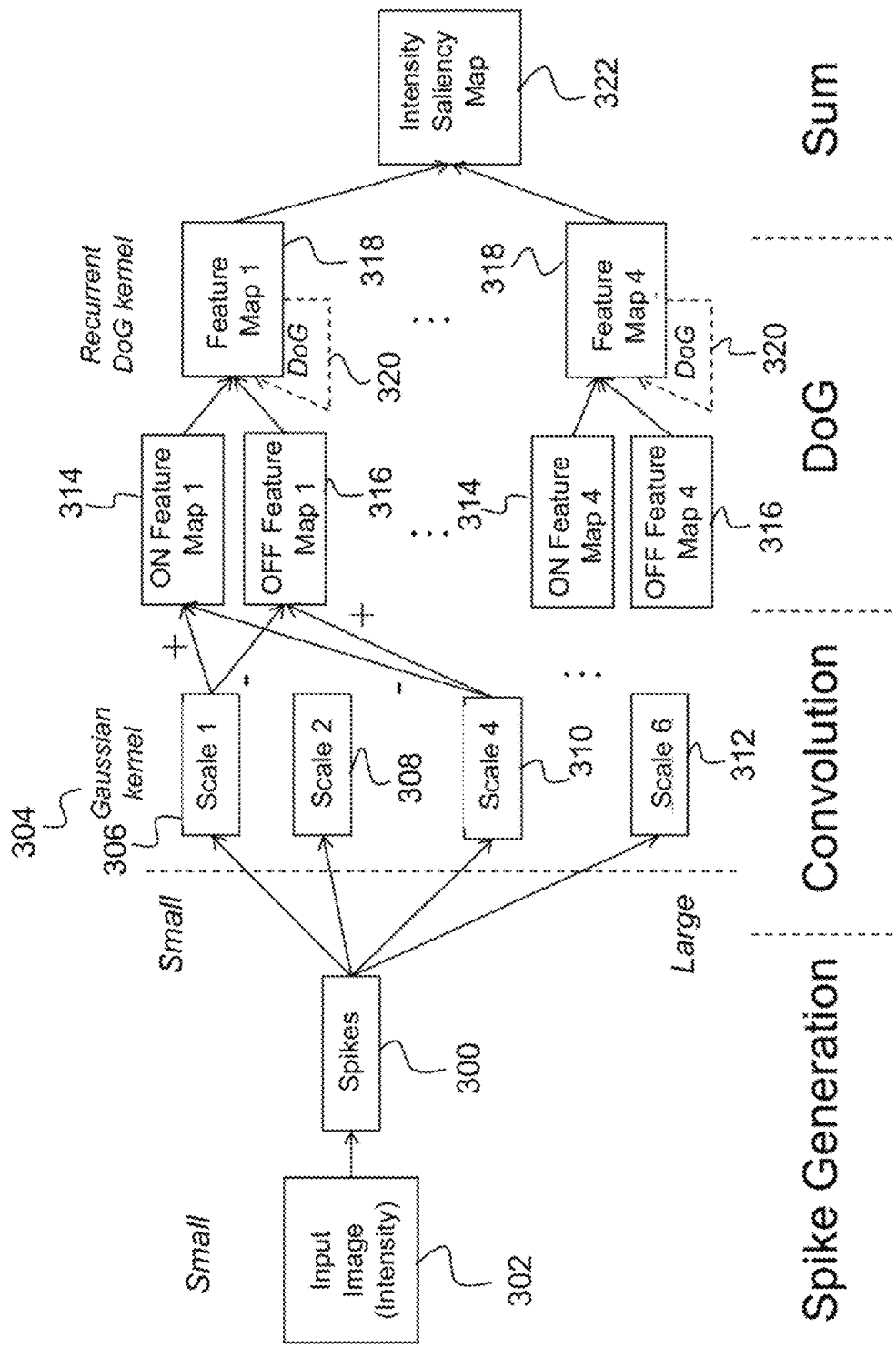
FIG. 3 is an illustration of a network structure for an intensity saliency map according to various embodiments of the present disclosure.

Object saliency can be determined from multiple channels, including image intensity and colors. FIG. 3 illustrates the network structure for a neuromorphic implementation of building up a saliency map from image intensity. Dashed arrow lines denote the connections are optional. First, spikes 300 are generated from the intensity of an input image 302. Then, the spikes 300, as an input map, is convolved with 6 Gaussian kernels 304 to generate Gaussian maps of 6 scales (e.g., scale 1 (element 306), scale 2 (element 308), scale 4 (element 310), scale 6 (element 312)). The Gaussian kernel 304 $W^i$ for scale i (i=1 . . . 6) is defined by:

$$W^i_{pq} = e^{-\frac{p^2+q^2}{2\sigma_i^2}}, \quad (4)$$

with $$\sigma_i = i*f, \quad (5)$$

where p, q=$-2\sigma_i$, . . . , $2\sigma_i$, and, hence, kernel size is $(4\sigma_i+1) \times (4\sigma_i+1)$. f is a constant scale factor, which can be varied to suit various-sized objects and image resolutions. For example, one can choose f=1 for detecting small-scale objects, such as persons, and, f=4 for medium-scale objects, such as cars.

Now, the summed input I(t) (see equation (1)) to the ith scale Gaussian map can be defined as:

$$I^i_{mn}(t) = \Sigma^{2\sigma_i}_{p,q=-2\sigma_i} A_{p+m,q+n}(t) W^i_{pq}, \quad (6)$$

where $A_{p+m,q+n}(t)$ is the input spikes 300 generated from input image intensity 302. These input spikes 300 are generated as follows:

At time t, a neuron at pixel (i,j) produces a spike if and only if $$\text{rand}( )<Q\tilde{I}_{ij}, \quad (7)$$

where rand( ) is a random number generator with uniform distribution on (0,1), Q is a constant to scale the frequency of spikes generated, and $\tilde{I}_{ij}$ is the image intensity at pixel (i,j) which is normalized to [0,1]. When the input image is a color image in RGB, $\tilde{I}_{ij}$ can be defined by $$\tilde{I}_{ij} = \frac{r_{ij}+g_{ij}+b_{ij}}{3*255 I_{ij}} = (r_{ij}+g_{ij}+b_{ij})/(3*255). \quad (8)$$

Q=0.5 was used in experimental studies.

Note that for all scales (elements 306-312), Gaussian maps are the same size in pixels as the input image (element 302). This is different from the model described by Itti et al. (Itti 1998, Itti 2000) in which the Gaussian pyramids with images of different sizes generated from sub-sampling the input image are used.

The next step is to generate ON and OFF feature maps, as depicted in FIG. 3. ON feature maps 314 are generated by subtracting large scale Gaussian maps from small scale Gaussian maps. Conversely OFF feature maps 316 are generated by subtracting small scale Gaussian maps from large scale Gaussian maps. For example, four ON feature maps 314 and four OFF feature maps 316 are generated in FIG. 3, using small scale Gaussian maps c=1, 2 and large scale Gaussian map s=c+{3,4}.

Then four final feature maps 318 are obtained by adding ON feature maps 314 and OFF feature maps 316. The feedback (or lateral inhibition) with DoG (Difference of Gaussian) kernel 320 is optional. For detecting the most salient objects, a strong lateral inhibition is needed to suppress weak objects. However, for detecting all interesting objects, no matter how salient they are, it is not advised to use a strong inhibition. Otherwise, weak objects can be suppressed. Interesting objects are normally not background objects. Cars and persons are typically interesting objects, while trees, grass, and roads are not. Some interesting objects, such as a small person, are considered less salient in existing models. In experimental studies, no lateral inhibition actually worked as well as a weak lateral inhibition. However, a weak lateral inhibition may sometimes help to suppress noise. Finally, all four final feature maps 318 are added to get a final intensity saliency map 322.

(3.3) Color Saliency

Figure 4:
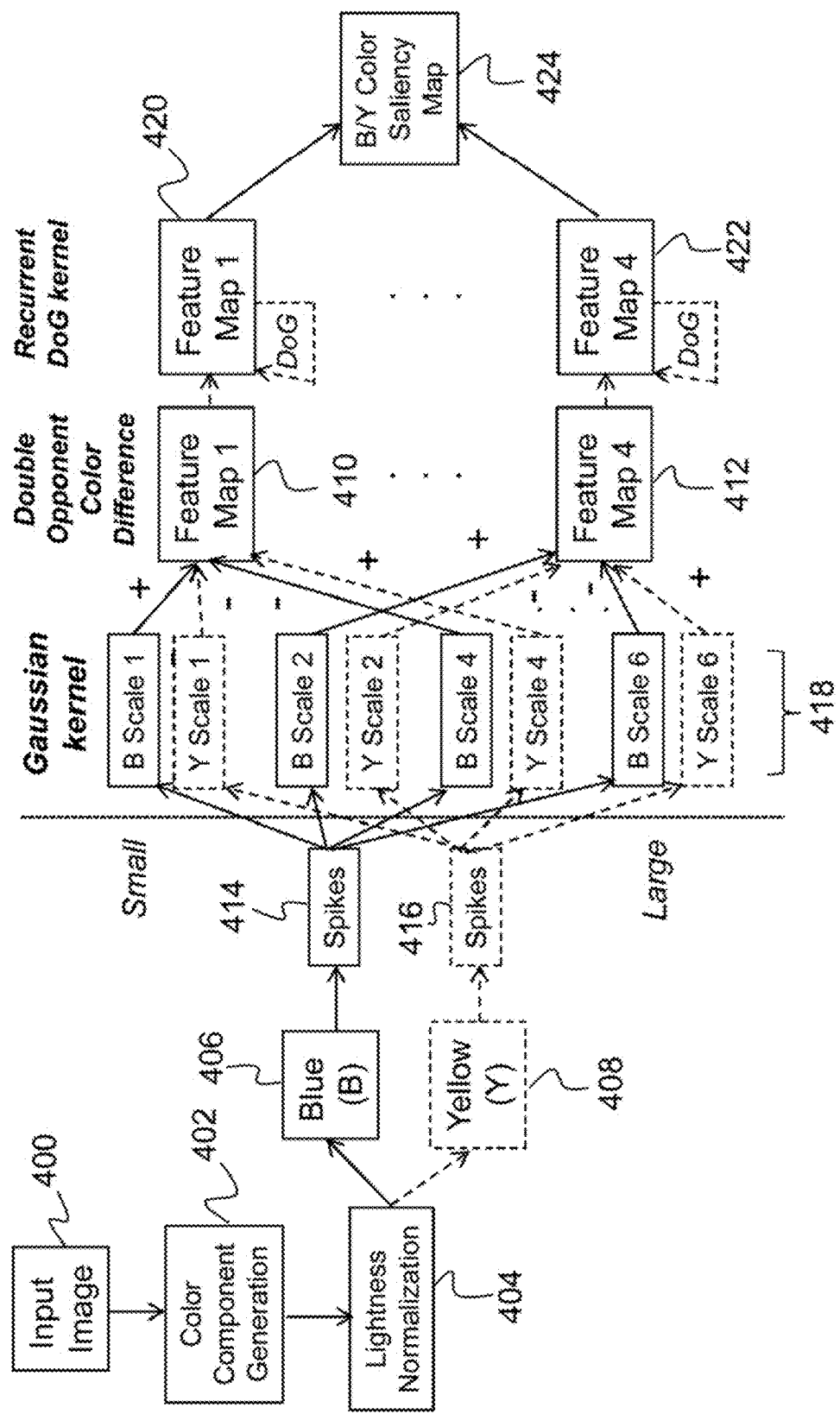
FIG. 4 is an illustration of a network structure for a color saliency map using blue/yellow opponent color channels as an example according to various embodiments of the present disclosure.

FIG. 4 illustrates network structure for a color saliency map, using blue/yellow color channels as an example. Dashed arrow lines denote the connections are optional. The color input image 400 (in rgb (red, green, blue)) is first normalized by local image intensity (I) to decouple hue from intensity as follows:

$$c=0, \text{ if } I<10, \quad (9)$$

$$c=c/I, \text{ if } I \geq 10, \quad (10)$$

where c is color r, g, or b, and I is image intensity defined by:

$$I=(r+g+b)/3. \quad (11)$$

Then four color components R (red), G (green), B (blue), Y (yellow) are generated as follows:

$$R = \max\left(r - \frac{g+b}{2}, 0\right), \quad (12)$$

$$G = \max\left(g - \frac{r+b}{2}, 0\right), \quad (13)$$

$$B = \max\left(b - \frac{r+g}{2}, 0\right), \quad (14)$$

$$Y = \max\left(\frac{r+g}{2} - \frac{|r-g|}{2} - b, 0\right). \quad (15)$$

This preprocessing step is the same as in the model described by Itti et al. It helps to generate pure color components (i.e., color component generation 402). However, it has a drawback. It generates stronger color signals in a dark image than in a bright image. Therefore, a lightness/brightness normalization 404 process is added in the model according to some embodiments of the present disclosure, which will be described in further detail below.

The remaining processes are similar to the intensity channel shown in FIG. 3. Spikes 414 and 416 are generated from the blue input 406 and the yellow input 408, respectively. Then, the spikes 414 and 416 are convolved with 6 Gaussian kernels 304 to generate Gaussian maps 418 of 6 scales for each color input (i.e., blue input 406 and yellow input 408). However, instead of one intensity input, for each double-opponent color pair (e.g., blue/yellow), there are two color inputs, a blue input 406 and a yellow input 408. As a result, each feature map (e.g., elements 410 and 412) for color difference has four inputs. The feature maps 410 and 412 are used to generate recurrent DoG kernel feature maps (e.g., elements 420 and 422), which are added to generate a color saliency map 424.

FIG. 4 only shows an example for a blue/yellow double-opponent color pair. Similarly, one can compute saliency maps for yellow/blue, red/green, and green/red double-opponent color pairs. Note that for each double-opponent color pair center/surround (C/S), the S (surround) color is optional. According to experimental studies, using only C (center) color is better and gives less noisy results in some cases (as described in detail below).

(3.4) Color Normalization by Global Brightness

As described above, the preprocessing that generates color components (element 402) produces stronger color signals in a dark image than in a bright image. This gives a stronger spike activity in the final color saliency map 424 for a dark image. However, when the proper lightness normalization 404 is performed, one can increase the color channel spike activity for a bright image while reducing the spike activity for a dark image, making the process invariant to image brightness. The process is to normalize the color components according to the overall intensity of an input image 400. The method is as follows. Let I be the image intensity with values from 0 to 255, the normalization factor is defined by:

$$N = \left(2 * \frac{mean(I)}{255}\right)^\alpha, \quad (16)$$

where mean(I) is the average intensity over all image pixels, α takes value between ½ and 1. In experimental studies, α=⅔ works well. Then, for each color component C (R, G, B, or Y), redefine C as:

$$C=N*C. \quad (17)$$

(3.5) Combine Multiple Channels to Detect Objects in Various Sizes and Colors

Figure 5:
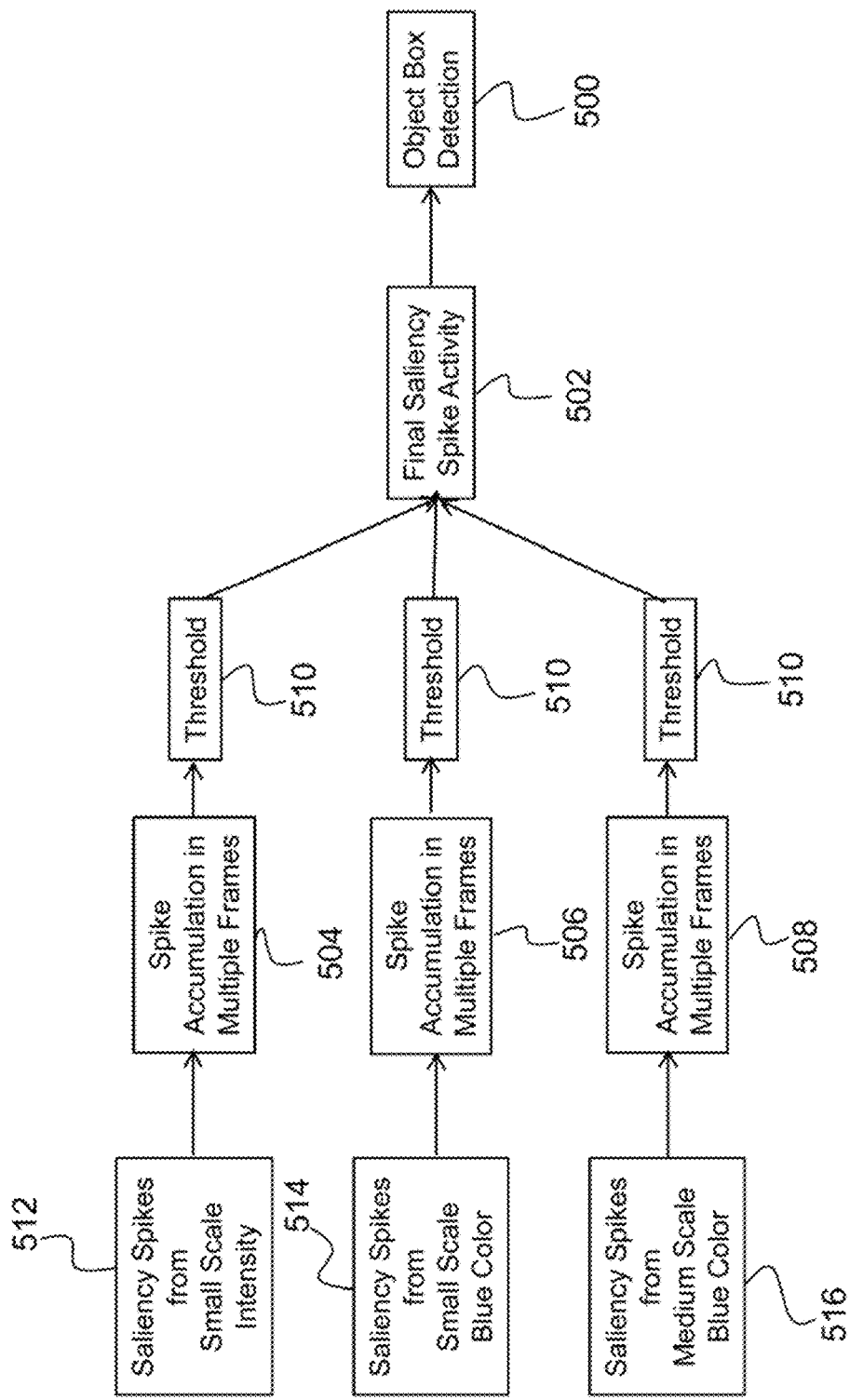
FIG. 5 is an illustration of the combination of multiple channels to detect objects in various sizes and colors according to various embodiments of the present disclosure.

Thus far there is one intensity channel (or intensity saliency map 322) and four double-opponent color channels (i.e., color saliency maps 424). Saliency maps from all these channels in a few scales (defined by the scale factor) can be added together to generate final object detection boxes 500. FIG. 5 depicts an example of how spikes from individual saliency maps can be added together for a video input to detect objects in various sizes and colors, in order to get a good final saliency spike activity 502, spikes in multiple consecutive frames may need to be first accumulated (i.e., spike accumulation in multiple frames 504, 506, and 508) and then thresholded 510 before adding multiple channels and scales together. Object detection boxes 500 can be obtained from the final saliency spike activity 502. By treating the final saliency spike activity map as a gray image, typical methods to add the object detection boxes to a saliency map can be used. In the simulation described below, 20 image frames were first accumulated. Then, the final saliency spike activity is obtained by:

$$S=0.5*\max(S_I-8,0)+S_C+\max(S_{CM}-6,0), \quad (18)$$

where S is the final saliency spike activity 502, $S_I$ is the accumulated spikes 504 from a small scale intensity channel 512 (or saliency map), $S_C$ is the accumulated spikes 506 from a small scale blue color channel 514, and $S_{CM}$ is the accumulated spikes 508 from a medium scale blue color channel 516. The numbers 8 and 6 in Equation (18) are thresholds 510. The weight and threshold number for each channel in Equation (18) are non-limiting examples that are determined by experimental studies on Stanford videos. They may be different for other videos. The accumulations need to go above the threshold to be considered in order to suppress noise. Anything below the threshold is considered noise.

(3.6) Experimental Studies

The model according to embodiments of the present disclosure was tested, in 25 Stanford videos (see Itti, L., (2013) "Neovision2 annotated video datasets," available at http://ilab.usc.edu/neo2/dataset/ taken on Mar. 8, 2016 for a description of the Stanford videos used to test the invention). Table I shows a list of non-limiting leakage and firing-threshold parameters used for spiking neurons.

TABLE 1

Leakage and firing-threshold parameters spiking neurons

Intensity Saliency Channel

|  | Leakage (L) | Firing Threshold (⊖) |
|---|---|---|
| Gaussian Maps | 0 | 1 |
| ON & OFF Feature Maps | 0 | 10 |
| Final Feature Maps | 0 | 2 |
| Saliency Map | 0 | 1 |

Color Saliency Channels

|  | Leakage (L) | Firing Threshold (⊖) |
|---|---|---|
| Gaussian Maps | −0.05 | 1 |
| Color Difference Feature Maps | 0 | 10 |
| Final Feature Maps | 0 | 2 |
| Saliency Map | 0 | 1 |

Figure 6A:
FIG. 6A is an input image according to various embodiments of the present disclosure.
Figure 6B:
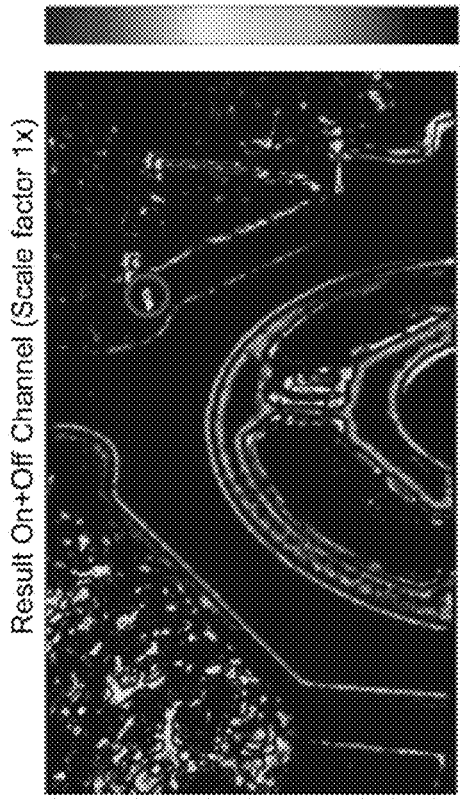
FIG. 6B is an illustration of a small-scale intensity channel detecting a still person in FIG. 6A according to various embodiments of the present disclosure.

FIGS. 6A and 6B shows an input image (FIG. 6A) and the result from a small-scale (scale factor f=1 in Equation 5) intensity saliency map (FIG. 6B). The intensity saliency map detects the still person (circled in red) with very strong spike activity.

FIGS. 7A and 7B show an input image (FIG. 7A) and the result from a medium-scale (scale factor f=4) blue color saliency map (FIG. 7B). It detects the blue car. Note that for all blue color channel results reported here an optional opponent color (e.g., yellow color) was not used. Doing so gives cleaner results in simulations.

Figure 8A:
FIG. 8A is an input image according to various embodiments of the present disclosure.
Figure 8B:
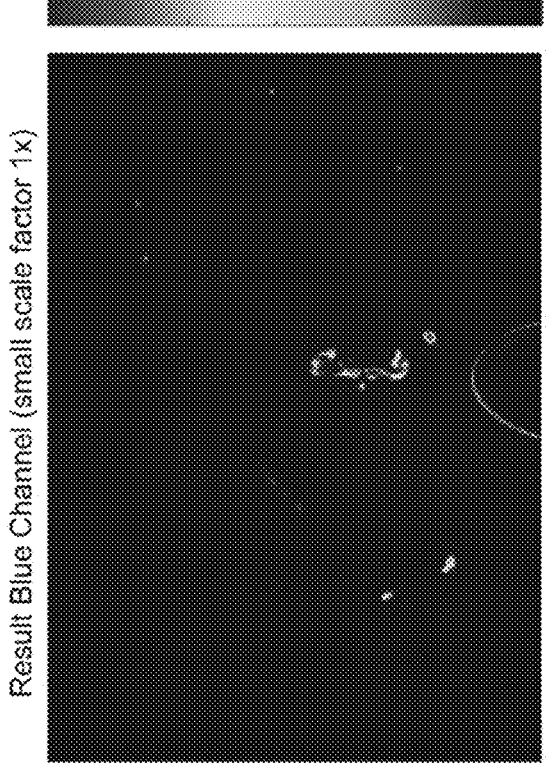
FIG. 8B is an illustration of a small-scale blue color channel detecting a person standing behind a blue car and two cyclists in FIG. 8A according to various embodiments of the present disclosure.

FIGS. 8A and 8B show an input image (FIG. 8A) and the result from a small-scale blue color saliency map (FIG. 8B). It detects the person in blue standing behind the blue car, and also the two cyclists on the road.

Figure 9B:
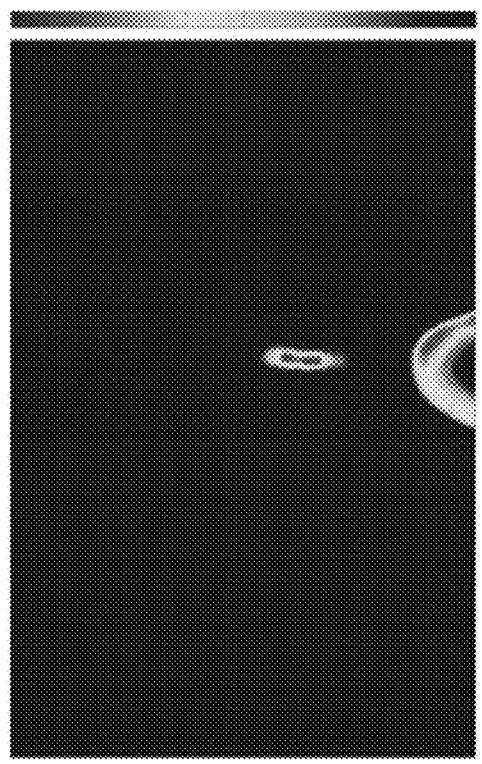
FIG. 9B is an illustration of a medium-scale blue color channel result for FIG. 9A without brightness normalization according to various embodiments of the present disclosure.
Figure 9D:
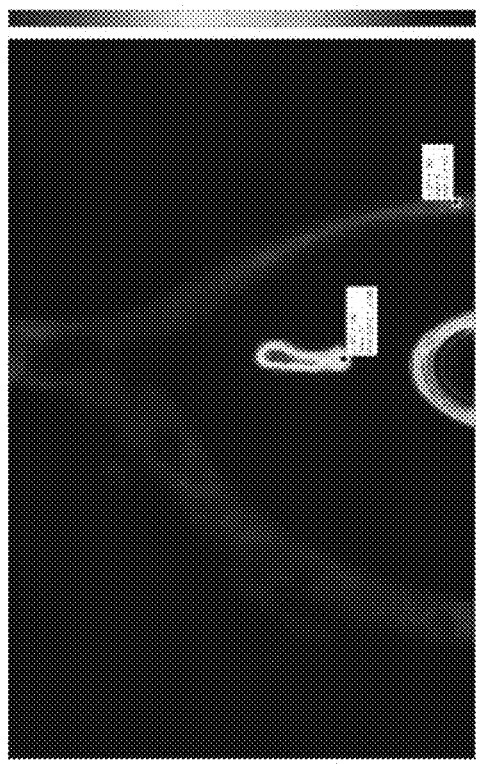
FIG. 9D is an illustration of a medium-scale blue color channel result for FIG. 9C without brightness normalization according to various embodiments of the present disclosure.
Figure 9A:
FIG. 9A is a bright input image according to various embodiments of the present disclosure.

FIGS. 9A-9D show the results from medium-scale blue color saliency maps (FIGS. 9B and 9D) for bright and dark images (FIGS. 9A and 9C, respectively), without brightness/lightness normalization. As shown in FIG. 9D, the spike activity for the dark image (FIG. 9C) is much stronger than the bright image (FIG. 9A). The largest spike activity for the bright image (FIG. 9A) is 16 spikes while it is 45 for the dark image (FIG. 9C) The dark image result (FIG. 9D) is also much noisier.

Figure 9C:
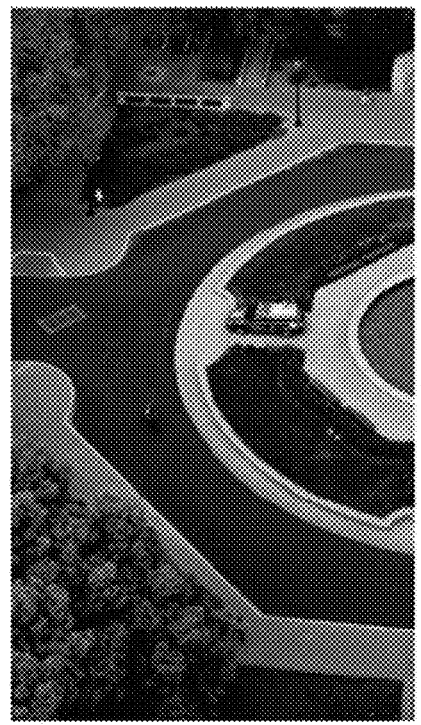
FIG. 9C is a dark input image according to various embodiments of the present disclosure.
Figure 10A:
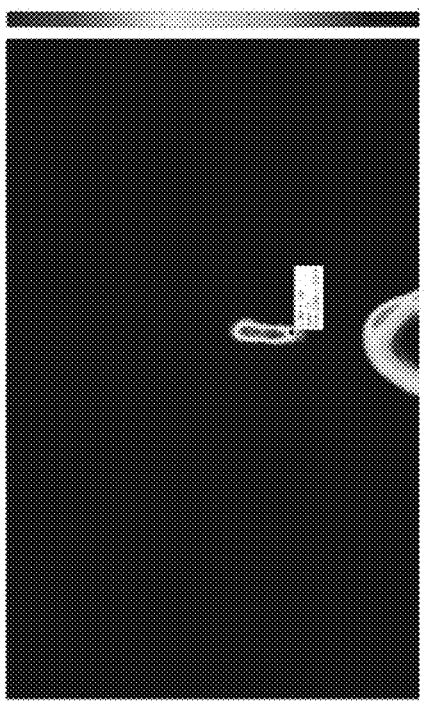
FIG. 10A is an illustration of a medium-scale blue color channel result for FIG. 9A with brightness normalization according to various embodiments of the present disclosure.
Figure 10B:
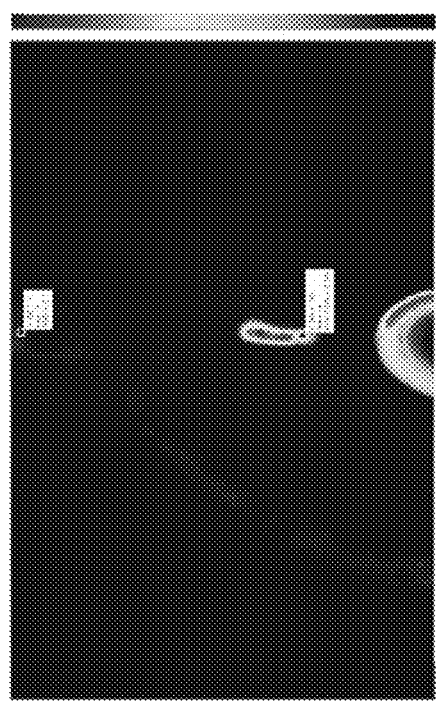
FIG. 10B is an illustration of a medium-scale blue color channel result for FIG. 9C with brightness normalization according to various embodiments of the present disclosure.

FIGS. 10A and 10B show the results after brightness normalization of FIGS. 9A and 9C, respectively. The spike activity is now at a similar level for both of the input images.

Figure 11:
FIG. 11 is an image result with object detection boxes from combining small-scale intensity, small-scale blue color, and medium-scale blue color channels according to various embodiments of the present disclosure.

FIG. 11 shows the result for object detection boxes from combining small-scale intensity, small-scale blue color, and medium-scale blue color channels. The result shown here is for image frame 38 in Stanford video sequence 037. The two still persons standing behind the blue car are detected. It also detects the blue car and the pool. Though the four walking persons on the road can be detected by a motion model, the special intensity and color channel combination (i.e., small-scale intensity, small-scale blue color and medium-scale blue color channels) can detect two of them. Adding red color and yellow color channels to the combination, the walking persons in red and yellow can be detected too.

The invention described herein has applications in any commercial products that could benefit from object detection and recognition. The miniature unmanned aerial vehicle (UAV) market is a non-limiting example of a commercial market that could benefit from the system according to embodiments of the present disclosure. A UAV can be built with object detection and recognition capabilities for surveillance with lower power requirements (from batteries) than conventional CPU/GPU implementation, resulting in UAVs that are lighter and/or have longer endurance times.

Furthermore, any application that requires low power video processing can benefit from the present invention. For example, self-driving vehicles (e.g., cars) equipped with spike-based processors can perform real-time video processing using the system described herein for real-time object detection and recognition (e.g., pedestrians, cars, street signs) at much lower power than is currently done, thereby enabling lighter and less expensive autonomous vehicles.

Finally, while this invention has been described in terms of several embodiments, one of ordinary skill in the art will readily recognize that the invention may have other applications in other environments. It should be noted that many embodiments and implementations are possible. Further, the following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". Further, while particular method steps have been recited in a particular order, the method steps may occur in any desired order and fall within the scope of the present invention.

What is claimed is:

1. A system for object detection using a spiking neural network, the system comprising:
one or more processors and a non-transitory memory having instructions encoded thereon such that when the instructions are executed, the one or more processors perform operations of:
generating an intensity saliency map from an intensity of an input image having color components using a spiking neural network, where in generating the intensity saliency map, the one or more processors perform operations of:
generating a plurality of spikes from the intensity of the input image;
convolving the plurality of spikes with Gaussian kernels to generate a plurality of Gaussian maps, each Gaussian map having a different scale;
generating a set of feature maps from the plurality of Gaussian maps;
generating a set of final feature maps by adding the set of feature maps; and
adding the set of final feature maps;
generating a color saliency map for multiple color components in the input image using a spiking neural network;

generating an object detection model by combining the intensity saliency map and the color saliency map; and detecting multiple objects of interest in the input image using the object detection model.

2. The system as set forth in claim 1, wherein the one or more processors further perform operations of:
generating a plurality of spikes for each color component in the input image;
for each mapped color component, convolving the plurality of spikes with Gaussian kernels to generate a plurality of Gaussian maps, each Gaussian map having a different scale;
for each mapped color component, generating a set of feature maps from the plurality of Gaussian maps;
for each mapped color component, generating a set of final feature maps by adding the set of feature maps; and
for each mapped color component, generating a color saliency map by adding the set of final feature maps.

3. The system as set forth in claim 2, wherein the one or more processors further perform operations of:
accumulating spikes from each intensity saliency map and color saliency map;
applying a threshold to the accumulated spikes;
obtaining a final saliency spike activity; and
obtaining object detection boxes from the final saliency spike activity.

4. The system as set forth in claim 1, wherein the color components are normalized according to an overall intensity of the input image.

5. The system as set forth in claim 4, wherein normalizing includes increasing spike activity for a bright image.

6. The system as set forth in claim 4, wherein normalizing includes reducing spike activity for a dark image.

7. The system as set forth in claim 1, wherein both salient and less salient objects of interest are detected in the input image.

8. The system as set forth in claim 1, wherein the object detection model is implemented in low power spiking neuromorphic hardware.

9. A computer-implemented method for object detection using a spiking neural network, comprising:
an act of causing one or more processors to execute instructions stored on a non-transitory memory such that upon execution, the one or more processors perform operations of:
generating an intensity saliency map from an intensity of an input image having color components using a spiking neural network, where in generating the intensity saliency map, the one or more processors perform operations of:
generating a plurality of spikes from the intensity of the input image;
convolving the plurality of spikes with Gaussian kernels to generate a plurality of Gaussian maps, each Gaussian map having a different scale;
generating a set of feature maps from the plurality of Gaussian maps;
generating a set of final feature maps by adding the set of feature maps; and
adding the set of final feature maps;
generating a color saliency map for multiple color components in the input image using a spiking neural network;
generating an object detection model by combining the intensity saliency map and the color saliency map; and
detecting multiple objects of interest in the input image using the object detection model.

10. The method as set forth in claim 9, wherein the one or more processors further perform operations of:
generating a plurality of spikes for each color component in the input image;
for each mapped color component, convolving the plurality of spikes with Gaussian kernels to generate a plurality of Gaussian maps, each Gaussian map having a different scale;
for each mapped color component, generating a set of feature maps from the plurality of Gaussian maps;
for each mapped color component, generating a set of final feature maps by adding the set of feature maps; and
for each mapped color component, generating a color saliency map by adding the set of final feature maps.

11. The method as set forth in claim 10, wherein the one or more processors further perform operations of:
accumulating spikes from each intensity saliency map and color saliency map;
applying a threshold to the accumulated spikes;
obtaining a final saliency spike activity; and
obtaining object detection boxes from the final saliency spike activity.

12. The method as set forth in claim 9, wherein the color components are normalized according to an overall intensity of the input image.

13. The method as set forth in claim 12, wherein normalizing includes increasing spike activity for a bright image.

14. The method as set forth in claim 12, wherein normalizing includes reducing spike activity for a dark image.

15. The method as set forth in claim 9, wherein both salient and less salient objects of interest are detected in the input image.

16. The method as set forth in claim 9, wherein the object detection model is implemented in low power spiking neuromorphic hardware.

17. A computer program product for object detection using a spiking neural network, the computer program product comprising:
computer-readable instructions stored on a non-transitory computer-readable medium that are executable by a computer having one or more processors, causing the one or more processors to perform operations of:
generating an intensity saliency map from an intensity of an input image having color components using a spiking neural network, where in generating the intensity saliency map, the one or more processors perform operations of:
generating a plurality of spikes from the intensity of the input image;
convolving the plurality of spikes with Gaussian kernels to generate a plurality of Gaussian maps, each Gaussian map having a different scale;
generating a set of feature maps from the plurality of Gaussian maps;
generating a set of final feature maps by adding the set of feature maps; and
adding the set of final feature maps;
generating a color saliency map for multiple color components in the input image using a spiking neural network;
generating an object detection model by combining the intensity saliency map and the color saliency map; and
detecting multiple objects of interest in the input image using the object detection model.

18. The computer program product as set forth in 17, further comprising instructions causing the one or more processors to perform operations of:

generating a plurality of spikes for each color component in the input image;

for each mapped color component, convolving the plurality of spikes with Gaussian kernels to generate a plurality of Gaussian maps, each Gaussian map having a different scale;

for each mapped color component, generating a set of feature maps from the plurality of Gaussian maps;

for each mapped color component, generating a set of final feature maps by adding the set of feature maps; and for each mapped color component, generating a color saliency map by adding the set of final feature maps.

19. The computer program product as set forth in claim 18, further comprising instructions causing the one or more processors to further perform operations of:

accumulating spikes from each intensity saliency map and color saliency map;

applying a threshold to the accumulated spikes;

obtaining a final saliency spike activity; and obtaining object detection boxes from the final saliency spike activity.

20. The computer program product as set forth in claim 17, wherein the color components are normalized according to an overall intensity of the input image.

21. The computer program product as set forth in claim 20, wherein normalizing includes increasing spike activity for a bright image.

22. The computer program product as set forth in claim 20, wherein normalizing includes reducing spike activity for a dark image.

23. The computer program product as set forth in claim 17, wherein both salient and less salient objects of interest are detected in the input image.

24. The computer program product as set forth in claim 17, wherein the object detection model is implemented in low power spiking neuromorphic hardware.

\* \* \* \* \*